United States Patent
Mizutani et al.

(10) Patent No.: US 12,052,399 B2
(45) Date of Patent: Jul. 30, 2024

(54) COMMUNICATION APPARATUS AND STORAGE MEDIUM STORING PROGRAM

(71) Applicant: BROTHER KOGYO KABUSHIKI KAISHA, Nagoya (JP)

(72) Inventors: Norio Mizutani, Mie (JP); Po Chun Chew, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/522,690

(22) Filed: Nov. 29, 2023

(65) Prior Publication Data

US 2024/0098201 A1    Mar. 21, 2024

Related U.S. Application Data (63) Continuation of application No. PCT/JP2022/014332, filed on Mar. 25, 2022.

(30) Foreign Application Priority Data

Jun. 8, 2021 (JP) ................................ 2021-096191

(51) Int. Cl.
H04N 1/32 (2006.01)
H04N 1/00 (2006.01)

(52) U.S. Cl.
CPC ....... *H04N 1/32096* (2013.01); *H04N 1/0044* (2013.01); *H04N 1/00928* (2013.01)

(58) Field of Classification Search
None
See application file for complete search history.

(56) References Cited

U.S. PATENT DOCUMENTS

2008/0077725 A1* 3/2008 Yabuki ............... H04N 1/32667
710/305
2014/0068130 A1 3/2014 Matsuura et al.
(Continued)

FOREIGN PATENT DOCUMENTS

JP 2008085554 A 4/2008
JP 2013084189 A 5/2013
(Continued)

OTHER PUBLICATIONS

International Preliminary Report on Patentability and Written Opinion dated Nov. 21, 2023 issued in PCT/JP2022/014332 together with English language translation.
(Continued)

*Primary Examiner* — Miya J Cato
(74) *Attorney, Agent, or Firm* — Scully, Scott, Murphy & Presser, PC (57) ABSTRACT

A controller acquires communication destination information including at least a first external apparatus connected via a first communication interface or a second external apparatus connected via a second communication interface. The controller performs initialization of the first communication interface and the second communication interface. The initialization includes: in response to determining that an external apparatus indicated by the communication destination information is the first external apparatus, after completing initialization of the first communication interface, shifting to a communication waiting state in which transmission and reception of data is acceptable; and in response to determining that the external apparatus indicated by the communication destination information is the second external apparatus, shifting to the communication waiting state after completing initialization of the second communication interface. The controller performs communication with at least the first external apparatus or the second (Continued)

external apparatus. The communication includes transmission and reception of the data.

20 Claims, 7 Drawing Sheets

(56) References Cited

U.S. PATENT DOCUMENTS

| | | | | |
|---|---|---|---|---|
| 2014/0153028 | A1* | 6/2014 | Kanakubo | G06K 15/408 |
| | | | | 358/1.14 |
| 2016/0147490 | A1* | 5/2016 | Koike | G06K 15/4045 |
| | | | | 358/1.6 |
| 2021/0019098 | A1* | 1/2021 | Tanihata | G06F 1/3206 |
| 2021/0298023 | A1* | 9/2021 | Otsuka | H04W 72/0453 |
| 2023/0329935 | A1* | 10/2023 | Kebir | H04W 64/00 |

FOREIGN PATENT DOCUMENTS

| | | |
|---|---|---|
| JP | 2014048730 A | 3/2014 |
| JP | 2014108545 A | 6/2014 |
| JP | 2021016941 A | 2/2021 |

OTHER PUBLICATIONS

International Search Report dated Jun. 21, 2022 issued in PCT/JP2022/014332.

* cited by examiner

COMMUNICATION APPARATUS AND STORAGE MEDIUM STORING PROGRAM

REFERENCE TO RELATED APPLICATIONS

This is a Continuation Application of International Application No. PCT/JP2022/014332 filed on Mar. 25, 2022, which claims priority from Japanese Patent Application No. 2021-096191 filed on Jun. 8, 2021. The entire content of each of the prior applications is incorporated herein by reference.

BACKGROUND ART

As a communication apparatus including a plurality of types of communication interfaces, a multifunction peripheral (abbreviated as MFP) including a USB interface and a network interface is known. The network interface includes a wired network interface and a wireless network interface.

DESCRIPTION

A communication apparatus performs various types of initialization including initialization of communication interfaces at the time of startup (for example, at the time of power-on). After various types of initialization are completed, the communication apparatus shifts to a state in which data transmission and reception to and from an external apparatus are acceptable (hereinafter referred to as a communication waiting state).

For example, a printing apparatus initializes a communication interface at power-on. In response to completion of initialization of an interface for performing communication with a host device, a controller opens a first logical port for notifying the host device of an error occurring during initialization of a printer unit, and in response to completion of initialization of the printer unit, opens a second logical port for receiving print data from the host device.

Some communication interfaces require a long time to initialize and others require a short time to initialize. For this reason, in a communication apparatus including a plurality of types of communication interfaces, there is a difference in initialization completion timing between the plurality of types of communication interfaces. Thus, if the communication apparatus including a plurality of types of communication interfaces shifts to a communication waiting state after initialization of all the communication interfaces is completed, a waiting time from startup of the apparatus until a communication process can be started becomes long.

In view of the foregoing, an example of an object of this disclosure is to shorten a waiting time from startup of an apparatus to a state where a communication process can be started (that is, the apparatus is ready to start a communication process).

According to one aspect, this specification discloses a communication apparatus. The communication apparatus includes a first communication interface, a second communication interface, and a controller. The controller is configured to acquire communication destination information. The communication destination information includes at least a first external apparatus connected via the first communication interface or a second external apparatus connected via the second communication interface. Thus, the communication apparatus acquires the communication destination information. The controller is configured to perform initialization of the first communication interface and the second communication interface. The initialization includes: in response to determining that an external apparatus indicated by the communication destination information is the first external apparatus, after completing initialization of the first communication interface, shifting to a communication waiting state in which transmission and reception of data is acceptable; and in response to determining that the external apparatus indicated by the communication destination information is the second external apparatus, shifting to the communication waiting state after completing initialization of the second communication interface. Thus, the communication apparatus appropriately performs initialization of the first communication interface and the second communication interface based on the communication destination information. The controller is configured to perform communication with at least the first external apparatus or the second external apparatus. The communication includes transmission and reception of the data. Thus, the communication apparatus appropriately performs communication with at least the first external apparatus or the second external apparatus.

The above configuration shortens a waiting time from startup of the apparatus to a state where the communication can be started.

Hereinafter, an embodiment of the present disclosure will be described with reference to the drawings as appropriate. The embodiment described below is merely an example of the present disclosure, and it is needless to say that the embodiment of the present disclosure may be appropriately changed without departing from the scope of the present disclosure. For example, the execution order of the processes described below may be changed as appropriate without departing from the scope of the present disclosure.

Configuration of System

Figure 1:
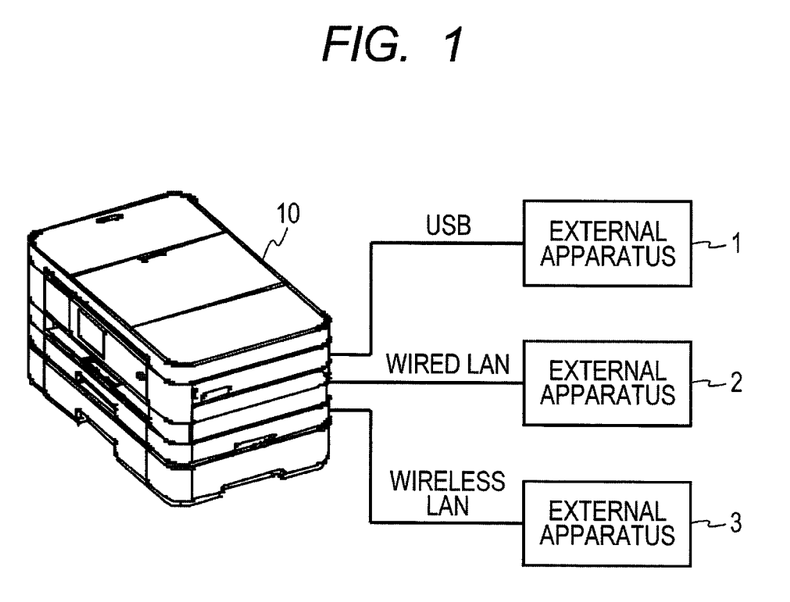
FIG. 1 is a diagram illustrating a configuration of a system including a multifunction peripheral (MFP) 10.

A system including a multifunction peripheral (MFP) 10 according to the present embodiment will be described with reference to FIG. 1. The system shown in FIG. 1 includes the MFP 10 and three external apparatuses 1 to 3. The MFP 10 has a print function, a scan function, a fax function, and so on. The MFP 10 and the external apparatuses 1 to 3 are communicably connected to each other via communication interfaces (hereinafter also referred to as interfaces) different from each other. In the system shown in FIG. 1, the MFP 10 and the external apparatus 1 are connected to each other via a USB. The MFP 10 and the external apparatus 2 are connected to each other via a wired LAN. The MFP 10 and the external apparatus 3 are connected to each other via a wireless LAN.

The external apparatuses 1 to 3 are any apparatuses configured to perform communication with the MFP 10. Examples of the external apparatuses 1 to 3 include a personal computer, a business computer, a terminal apparatus, a mobile phone, a smartphone, and a tablet terminal. The external apparatuses 1 to 3 may be a data server, a data storage, a printer, a facsimile apparatus, a relay apparatus for communication, and so on.

Configuration of MFP 10

Figure 2:
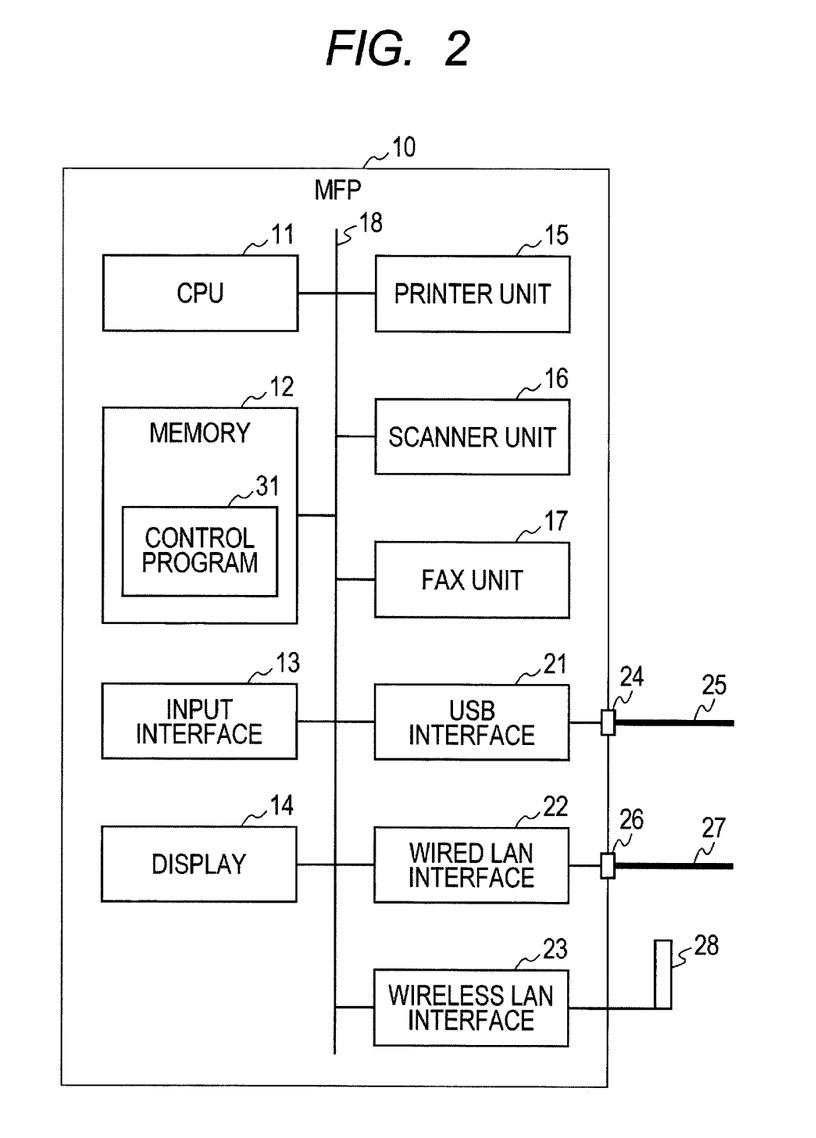
FIG. 2 is a block diagram of the MFP 10.

As shown in FIG. 2, the MFP 10 includes a CPU 11, a memory 12, an input interface 13, a display 14, a printer unit 15, a scanner unit 16, a FAX unit 17, a USB interface 21, a wired LAN interface 22, and a wireless LAN interface 23. These elements are connected via an internal bus 18. The USB interface 21, the wired LAN interface 22, and the wireless LAN interface 23 are communication interfaces. Among them, the wired LAN interface 22 and the wireless LAN interface 23 are network interfaces. The MFP 10 is an example of a communication apparatus.

The CPU 11 controls the operation of the MFP 10. The CPU 11 executes a control program 31 stored in the memory 12 based on an instruction or information from a user input via the input interface 13, various kinds of information received from the external apparatuses 1 to 3 connected via the communication interfaces, and so on. The CPU 11 is an example of a controller of the communication apparatus.

The memory 12 stores the control program 31 to be executed by the CPU 11 and data or information required for execution of the control program 31. The memory 12 is configured by, for example, a RAM, a ROM, an EEPROM, an HDD, a portable storage medium such as a USB memory attachable to and detachable from the MFP 10, a buffer provided in the CPU 11, or a combination thereof. The control program 31 is an example of a program executed by the controller of the communication apparatus.

The memory 12 may be a computer-readable storage medium. The computer-readable storage medium is a non-transitory medium. The non-transitory medium includes a recording medium such as a CD-ROM and a DVD-ROM in addition to the above-described examples. The non-transitory medium is also a tangible medium. On the other hand, an electric signal carrying a program downloaded from a server and so on on the Internet is a computer-readable signal medium which is a kind of computer-readable medium, but is not included in the non-transitory computer-readable storage medium.

The input interface 13 is an element operated by a user to input an instruction, information, and so on, to the MFP 10. The input interface 13 is, for example, a touch panel. The display 14 is an element that displays a state of the MFP 10, a message, and so on, on a screen. The display 14 is, for example, a liquid crystal display or an organic EL display. The touch panel having a display function functions as the input interface 13 and the display 14.

The printer unit 15 is an element that performs printing on a sheet based on data received via the communication interface. The printer unit 15 may perform printing by, for example, an ink jet method in which ink is ejected to record an image, or may perform printing by another method. The printer unit 15 may perform both black-and-white printing and color printing, or may perform only black-and-white printing.

The scanner unit 16 is an element that optically reads an image on a sheet placed on a reading unit (not shown) of the MFP 10 and outputs image data. The scanner unit 16 may scan both black-and-white images and color images, or may scan only black-and-white images.

The FAX unit 17 has a function of transmitting image data output from the scanner unit 16 to the external apparatuses 1 to 3 connected via the communication interface and a function of reproducing an image on a sheet based on image data received from the external apparatuses 1 to 3 connected via the communication interface. The printer unit 15 is used to reproduce the image.

The communication interface is an interface circuit that transmits and receives data to and from the external apparatuses 1 to 3. The USB interface 21 is an interface circuit that transmits and receives data to and from the external apparatus 1 connected via the USB. The wired LAN interface 22 is an interface circuit that transmits and receives data to and from the external apparatus 2 connected via the wired LAN. The wireless LAN interface 23 is an interface circuit that transmits and receives data to and from the external apparatus 3 connected via the wireless LAN. The USB interface 21 is an example of a first communication interface. The wired LAN interface 22 and the wireless LAN interface 23 are examples of a second communication interface. The wired LAN interface 22 is an example of a wired network interface. The wireless LAN interface 23 is an example of a wireless network interface. The external apparatus 1 is an example of a first external apparatus. The external apparatuses 2 and 3 are examples of a second external apparatus.

In order to perform communication via USB, a USB cable 25 is connected to a USB port 24 that is electrically connected to the USB interface 21. A USB memory (not shown) and so on may be directly connected to the USB port 24. In order to perform communication via the wired LAN, a LAN cable 27 is connected to a LAN port 26 that is electrically connected to the wired LAN interface 22. In order to perform communication via the wireless LAN, a wireless LAN antenna 28 is mounted on the MFP 10, and the wireless LAN antenna 28 is electrically connected to the wireless LAN interface 23. The wireless LAN antenna 28 is mounted on the MFP 10 by, for example, inserting a circuit board having the wireless LAN antenna 28 into a slot of the MFP 10.

As described above, the memory 12 stores the control program 31, and the CPU 11 executes the control program 31 stored in the memory 12. The input interface 13, the display 14, the printer unit 15, the scanner unit 16, the FAX unit 17, the USB interface 21, the wired LAN interface 22, and the wireless LAN interface 23 operate under the control of the CPU 11. In this way, the MFP 10 executes a print operation, a scan operation, a FAX operation, and so on.

Initialization of Communication Interface

The MFP 10 is started up at power-on, reset, and so on. When the MFP 10 is started up, the CPU 11 executes the control program 31 from a particular position (a particular address of the memory 12). The particular position of the control program 31 includes a program code for initializing the MFP 10. When the MFP 10 is started up, the CPU 11 executes the program code and performs various types of initialization including initialization of the communication interfaces.

When the MFP 10 is started up, the CPU 11 initializes the USB interface 21, the wired LAN interface 22, and the wireless LAN interface 23. There are differences in the time required for initialization between these three types of communication interfaces. In general, the time required for initialization of the USB interface 21 is short, whereas the time required for initialization of the wireless LAN interface 23 is long. This is because, in the initialization of the wireless LAN interface 23, a process of searching for a wireless LAN access point and so on is performed.

Figure 3:
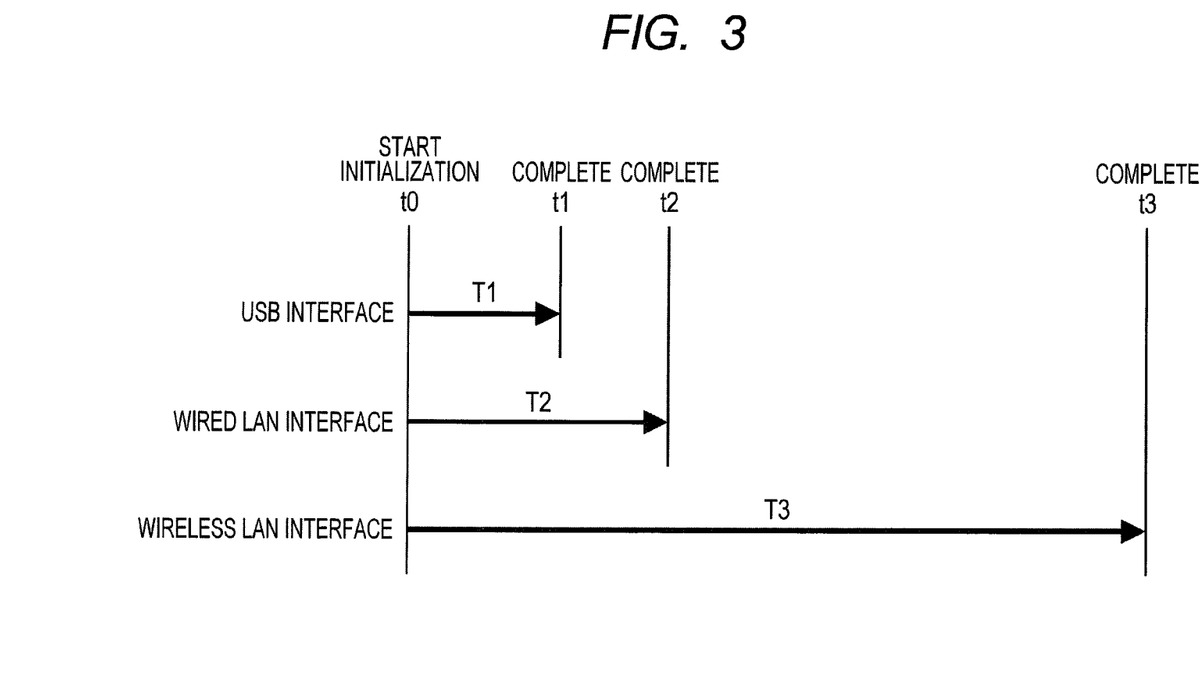
FIG. 3 is a diagram showing time required for initializing communication interfaces by the MFP 10.

In the example shown in FIG. 3, the initialization of the three types of communication interfaces is started at the same time at time to. The initialization of the USB interface 21 is completed at time t1. The initialization of the wired LAN interface 22 is completed at time t2 later than time t1. The initialization of the wireless LAN interface 23 is completed at time t3 later than time t2. A required time T2 required for initialization of the wired LAN interface 22 is longer than a required time T1 required for initialization of the USB interface 21. Further, a required time T3 required for the initialization of the wireless LAN interface 23 is longer than the required time T2 required for the initialization of the wired LAN interface 22.

In a case where there are differences in the time required for initialization between the three types of communication interfaces as described above, when the CPU 11 shifts to a communication waiting state (a state in which transmission and reception of data in a communication process is acceptable) after initialization of all the communication interfaces is completed, a waiting time from startup of the MFP 10 until the communication process is started becomes long. That is, the waiting time from when the user instructs power-on or reset until it becomes ready to instruct the MFP 10 to transmit data becomes long. According to the MFP 10 of the present embodiment, this problem is solved.

Operation of MFP 10

The operation of the MFP 10 will be described with reference to FIGS. 4 to 6. In particular, an initialization process of the MFP 10 will be described. The flowcharts in this specification basically show processes of the CPU 11 in accordance with instructions written in programs. That is, in the following description, processes such as "judgment", "determination", "instruction", "confirmation", "transition", and "acquisition" represent processes of the CPU 11. Here, "acquisition" is used as a concept that does not need a request. That is, the concept of "the CPU 11 acquires data" also includes a process of receiving the data without a request by the CPU 11. Further, "data" in this specification is represented by a computer-readable bit string. And, data having substantially the same content but different formats are treated as the same data. The same applies to "information" in this specification.

In the initialization process of the MFP 10, information stored in the memory 12 is referred to before the communication interfaces are initialized. This information includes a set transmission destination, a communication history, and a planned transmission mode. In the MFP 10, for example, there is a case where the user sets the transmission destination of data in advance so that an external apparatus of the transmission destination to which the data is transmitted after startup is set in advance as a default. The set transmission destination is information indicating an external apparatus of the transmission destination to which the started MFP 10 first transmits data. The communication history is history information related to past communication processes performed by the MFP 10. The communication history includes an external apparatus to which the MFP 10 has transmitted data in the past and an external apparatus from which the MFP 10 has received data in the past.

In the MFP 10, for example, there is a case where the user sets the planned transmission mode in advance so that the planned transmission mode for transmitting data after startup is set in advance as a default. The planned transmission mode includes a preview image display mode indicating whether to display a preview image on the display 14 before transmitting data. When the preview image display mode is enabled, in response to receiving a data transmission instruction of a communication process from the user, the CPU 11 displays a preview image on the display 14 before transmitting the data and waits for a user's operation for transmitting the data. After displaying the preview image on the display 14, in response to receiving a confirmation operation based on the preview from the user, the CPU 11 transmits the data.

Figure 4:
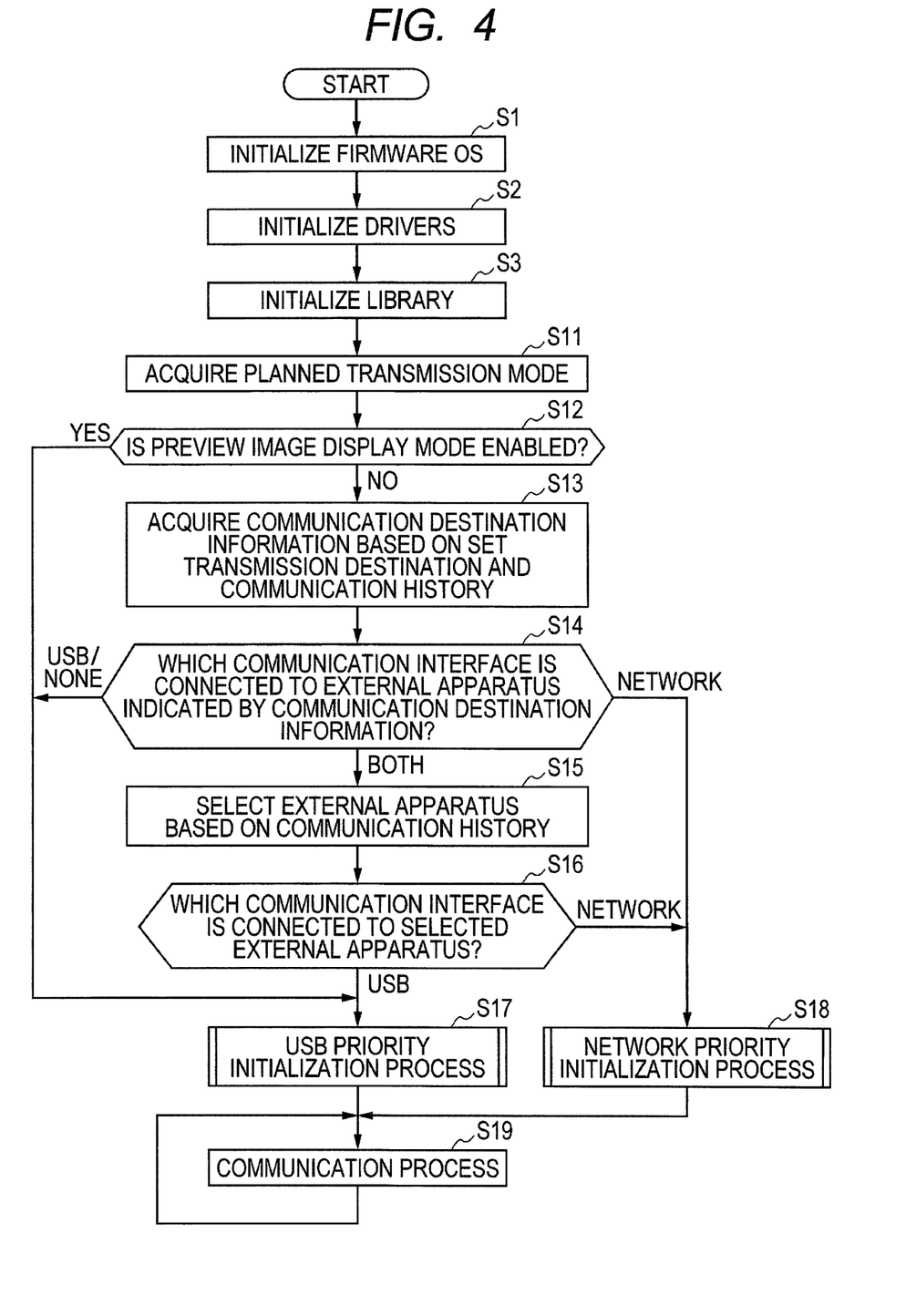
FIG. 4 is a flowchart showing operations of the MFP 10.

As shown in FIG. 4, at the time of startup of the MFP 10, the CPU 11 performs various initialization necessary for execution of the control program 31. First, the CPU 11 initializes a firmware OS (S1). The firmware OS is an OS installed in the MFP 10 to execute the control program 31. Next, the CPU 11 initializes drivers (S2). In S2, the CPU 11 initializes drivers used for USB-based communication, wired LAN-based communication, wireless LAN-based communication, speaker control, display panel control, and so on. Next, the CPU 11 initializes a library (S3). In S3, the CPU 11 initializes data of various low-level programs called from the control program 31.

Next, the CPU 11 acquire the planned transmission mode from the memory 12 (S11). Next, the CPU 11 determines whether the preview image display mode included in the planned transmission mode acquired in S11 is enabled (S12). In response to determining that the preview image display mode is not enabled (S12: No), the CPU 11 acquires communication destination information based on at least the set transmission destination or the communication history (S13). The communication destination information indicates an external apparatus as a communication destination of a communication process performed by the started MFP 10.

In a case where a specific external apparatus is set as the set transmission destination, the CPU 11 may acquire communication destination information including the external apparatus set as the data transmission destination. Further, the CPU 11 may acquire communication destination information including the external apparatus stored in the communication history.

The communication destination information includes one or more external apparatuses among the external apparatuses 1 to 3. The communication destination information includes at least the external apparatus 1 connected via the USB interface 21 and one of the external apparatuses 2 and 3 connected via the network interface. The communication destination information does not necessarily include all of the external apparatuses set as the data transmission destination and the external apparatuses stored in the communication history.

Next, the CPU 11 determines the communication interface connected to the external apparatus indicated by the communication destination information based on the communication destination information acquired in S13 (S14). In response to determining that the communication interface is the USB interface 21 or that there is no communication interface (S14: USB/None), the CPU 11 executes a USB priority initialization process shown in FIG. 5 (S17). In response to determining that the communication interface is a network interface (the wired LAN interface 22 or the wireless LAN interface 23) (S14: Network), the CPU 11 executes a network priority initialization process shown in FIG. 6 (S18). In S14, it is determined that there is no communication interface, for example, in a case where no set transmission destination is set and no communication history is stored yet, or in a case where a problem and so on occurs in the set transmission destination or the communication history.

In response to determining in S14 that the communication interface includes both the USB interface 21 and the network interface (S14: Both), the CPU 11 selects one of the external apparatuses based on the communication history (S15). For example, the CPU 11 may acquire communication destination information including an external apparatus recorded in the communication history as the last communication destination at the time of the previous power-on of the MFP 10. Alternatively, the CPU 11 may acquire communication destination information including an external apparatus whose communication history indicates that communication has been most frequently performed within a particular time period from the current time point. Next, the CPU 11 determines the communication interface connected to the external apparatus selected in S15 (S16). In response to determining that the communication interface is the USB interface 21 (S16: USB), the CPU 11 executes the USB priority initialization process shown in FIG. 5 (S17). In response to determining that the communication interface is the network interface (S16: Network), the CPU 11 executes the network priority initialization process shown in FIG. 6 (S18).

In response to determining that the preview image display mode is enabled in S12 (S12: Yes), the CPU 11 executes the USB priority initialization process shown in FIG. 5 (S17). In this case, the CPU 11 executes the USB priority initialization process shown in FIG. 5 regardless of the communication destination information.

In S17 or S18, the CPU 11 executes a first initialization process of initializing the USB interface 21 and a second initialization process of initializing the network interface. After executing S17 or S18, until the power is turned off, the CPU 11 repeatedly executes the communication process in response to a user's instruction input via the input interface 13 or an instruction from the external apparatuses 1 to 3 (S19). In S19, the CPU 11 performs transmission and reception of data with the external apparatus 1 connected via the USB interface 21 and at least one of the external apparatuses 2 and 3 connected via the network interface.

Figure 5:
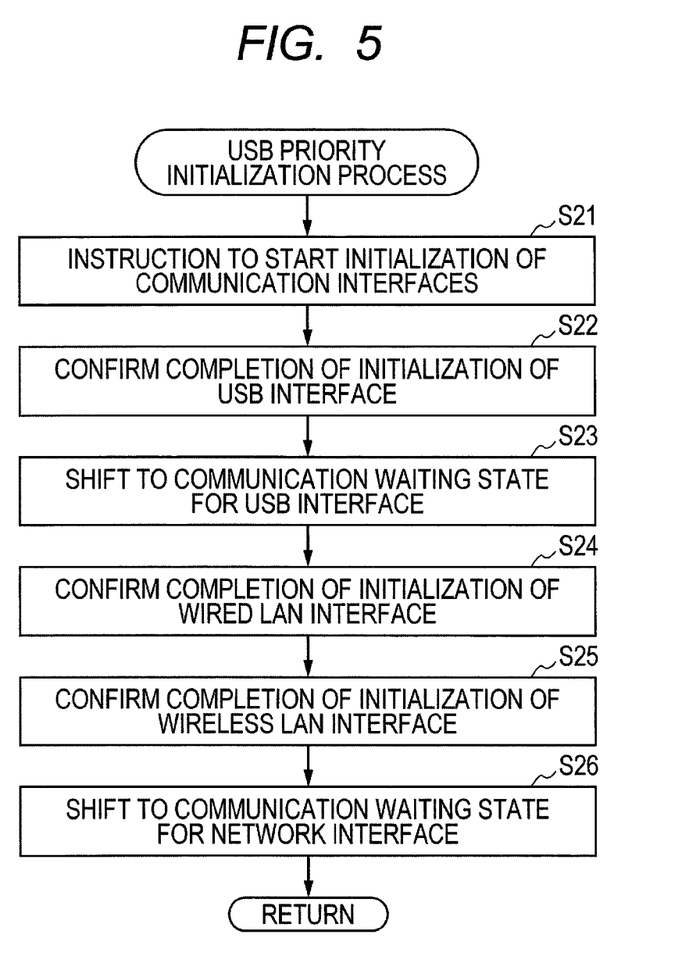
FIG. 5 is a flowchart of a USB priority initialization process of the MFP 10.

In the USB priority initialization process shown in FIG. 5, the CPU 11 first provides an instruction to start initialization of the three types of communication interfaces (S21). In S21, the CPU 11 outputs an initialization start instruction to the three types of communication interfaces at the same time or in a particular order. For example, the CPU 11 first outputs the initialization start instruction to the USB interface 21, second outputs the initialization start instruction to the wired LAN interface 22, and third outputs the initialization start instruction to the wireless LAN interface 23.

In response to receiving the initialization start instruction from the CPU 11, the USB interface 21 initializes a circuit within the USB interface 21 and becomes an initialization completion state when the initialization is complete. The wired LAN interface 22 and the wireless LAN interface 23 operate in the same manner. In the initialization of each communication interface, mainly resetting of the circuit is performed. In the initialization of the wireless LAN interface 23, a search for a wireless LAN access point and so on are also performed. The start of initialization is instructed by the CPU 11 writing a value instructing the start of initialization to a command register of each communication interface. When the initialization of the circuit is completed, each communication interface writes a value indicating completion of initialization to a status register of each communication interface and becomes an initialization completion state. The CPU 11 confirms completion of initialization of each communication interface by repeatedly checking the value of the status register of each communication interface.

Next, the CPU 11 confirms completion of initialization of the USB interface 21 (S22). The CPU 11 waits in S22 until the USB interface 21 becomes an initialization completion state. Next, the CPU 11 shifts to a communication waiting state (a state in which transmission and reception of data in the communication process is acceptable) for the USB interface 21 (S23). In S23, the CPU 11 controls the display 14 to display that transmission and reception of data in the communication process via the USB interface 21 is acceptable. After executing S23, the CPU 11 becomes a communication waiting state in which transmission and reception of data in the communication process via the USB interface 21 is acceptable.

Next, the CPU 11 confirms completion of initialization of the wired LAN interface 22 (S24). The CPU 11 waits in S24 until the wired LAN interface 22 becomes an initialization completion state. Next, the CPU 11 confirms completion of initialization of the wireless LAN interface 23 (S25). The CPU 11 waits in S25 until the wireless LAN interface 23 becomes an initialization completion state. Next, CPU 11 shifts to a communication waiting state for the network interface (S26). In S26, the CPU 11 controls the display 14 to display that transmission and reception of data in the communication process via the network interface is also acceptable. After executing S26, the CPU 11 becomes a communication waiting state in which transmission and reception of data in the communication process via the network interface is also acceptable. After executing S26, the CPU 11 ends the USB priority initialization process shown in FIG. 5 and returns to the calling routine.

The USB priority initialization process shown in FIG. 5 is executed when the communication process via the USB interface 21 is performed after the MFP 10 is started up (or when it is predicted that the communication process via the USB interface 21 is performed) based on the communication destination information acquired in S13 or selected in S16. In general, the time required for initialization of the USB interface 21 is shorter than the time required for initialization of the network interface. In the USB priority initialization process shown in FIG. 5, after the initialization of the USB interface 21 is completed, the CPU 11 shifts to a communication waiting state in which transmission and reception of data in the communication process is acceptable without waiting for the completion of initialization of the network interface. Thus, when the external apparatus indicated by the communication destination information is the external apparatus 1 connected via the USB interface 21, it is possible to shorten the waiting time from the startup of the MFP 10 until the communication process can be started.

Figure 6:
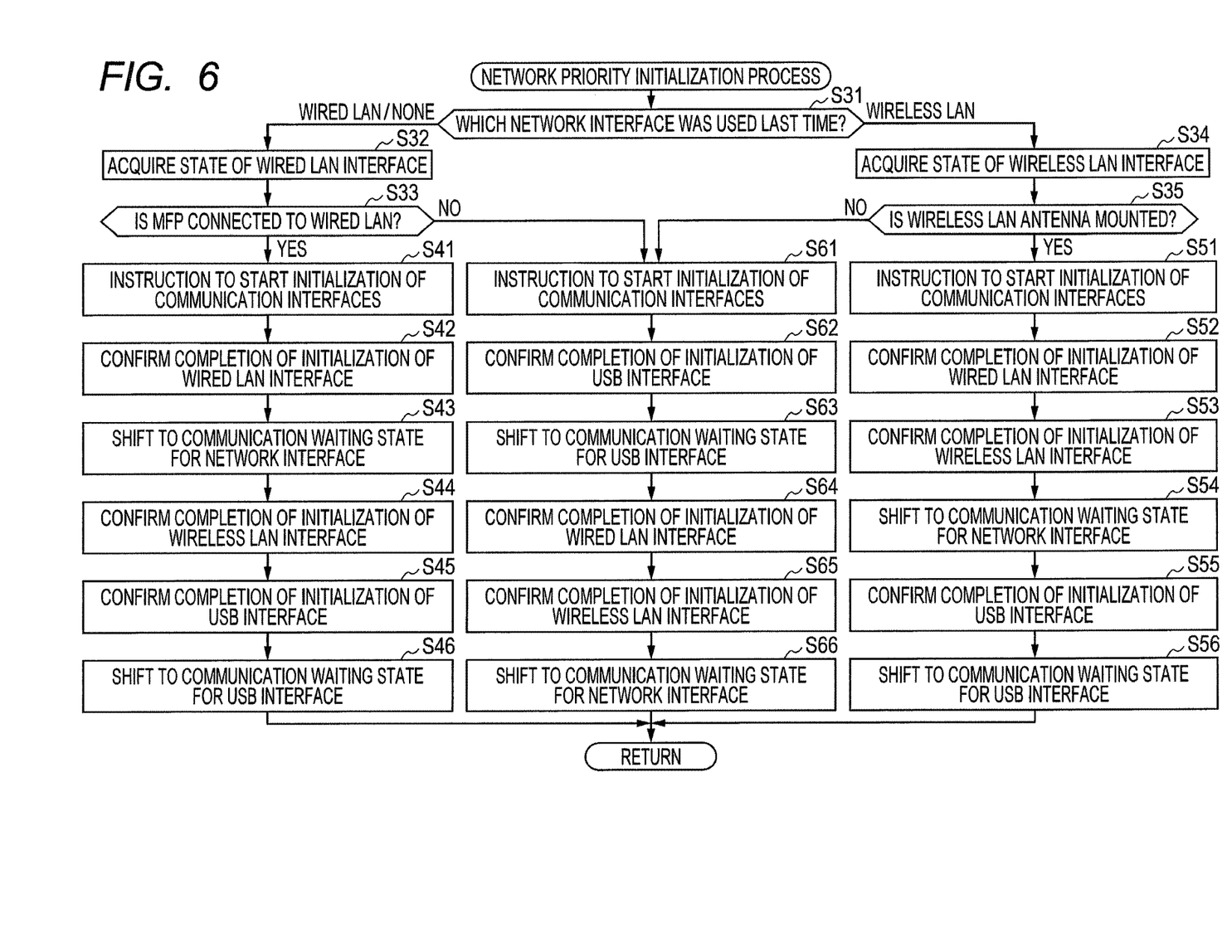
FIG. 6 is a flowchart of a network priority initialization process of the MFP 10.

In the network priority initialization process shown in FIG. 6, the CPU 11 first determines the previously used network interface (S31). Here, the previously used network interface refers to the network interface that was used last time to transmit and receive data of the communication process before the MFP 10 is started up. The previously used network interface is either the wired LAN interface 22 or the wireless LAN interface 23. In S31, it is determined that there is no previously used network interface, for example, in a case where the previously used network interface is unknown or in a case where a particular time or more has elapsed since the communication process via the network interface is performed.

In response to determining that the previously used network interface is the wired LAN or that there is no previously used network interface (S31: Wired LAN/None), the CPU 11 acquires a state of the wired LAN interface 22 (S32). The state of the wired LAN interface acquired in S32 includes information indicating whether the MFP 10 is connected to the wired LAN (for example, information indicating whether the LAN cable 27 is connected to the LAN port 26). This information is an example of information indicating whether the wired LAN interface 22 is in a physically communicable state.

Next, the CPU 11 determines whether the MFP 10 is connected to the wired LAN based on the state acquired in S32 (S33). The CPU 11 proceeds to S41 in response to determining that the MFP 10 is connected to the wired LAN (S33: Yes), and proceeds to S61 in response to determining that the MFP 10 is not connected to the wired LAN (S33: No).

In response to determining that the previously used network interface in S31 is the wireless LAN interface 23 (S31: Wireless LAN), the CPU 11 acquires a state of the wireless LAN interface 23 (S34). The state of the wireless LAN interface 23 acquired in S34 includes information indicating whether the wireless LAN antenna 28 is mounted on the MFP 10 (for example, information indicating whether a circuit board including the wireless LAN antenna 28 is inserted into a slot of the MFP 10). This information is an example of information indicating whether the wireless LAN interface 23 is in a physically communicable state.

Next, the CPU 11 determines whether the wireless LAN antenna 28 is mounted on the MFP 10 based on the state acquired in S34 (S35). The CPU 11 proceeds to S51 in response to determining that the wireless LAN antenna 28 is mounted (S35: Yes), and proceeds to S61 in response to determining that the wireless LAN antenna 28 is not mounted (S35: No).

In S41, the CPU 11 instructs to start initialization of the three types of communication interfaces. In S41, the CPU 11 outputs an initialization start instruction to the three types of communication interfaces at the same time or in a particular order. For example, the CPU 11 first outputs the initialization start instruction to the wired LAN interface 22, second outputs the initialization start instruction to the wireless LAN interface 23, and third outputs the initialization start instruction to the USB interface 21.

Next, the CPU 11 confirms completion of initialization of the wired LAN interface 22 (S42). The CPU 11 waits in S42 until the wired LAN interface 22 becomes an initialization completion state. Next, the CPU 11 shifts to a communication waiting state for the network interface (S43). In S43, the CPU 11 controls the display 14 to display that transmission and reception of data in the communication process via the network interface is acceptable. After executing S43, the CPU 11 becomes a communication waiting state in which transmission and reception of data in the communication process via the network interface is acceptable.

Next, the CPU 11 confirms completion of initialization of the wireless LAN interface 23 (S44). The CPU 11 waits in S44 until the wireless LAN interface 23 becomes an initialization completion state. Next, the CPU 11 confirms completion of initialization of the USB interface 21 (S45). The CPU 11 waits in S45 until the USB interface 21 becomes an initialization completion state. Next, the CPU 11 shifts to a communication waiting state for the USB interface 21 (S46). In S46, the CPU 11 controls the display 14 to display that transmission and reception of data in the communication process via the USB interface 21 is also acceptable. After executing S46, the CPU 11 becomes a communication waiting state in which transmission and reception of data in the communication process via the USB interface 21 is also acceptable.

In S51, the CPU 11 instructs to start initialization of the three types of communication interfaces. In S51, the CPU 11 outputs an initialization start instruction to the three types of communication interfaces at the same time or in a particular order. For example, the CPU 11 first outputs the initialization start instruction to the wired LAN interface 22, second outputs the initialization start instruction to the wireless LAN interface 23, and third outputs the initialization start instruction to the USB interface 21.

Next, the CPU 11 confirms completion of initialization of the wired LAN interface 22 (S52). The CPU 11 waits in S52 until the wired LAN interface 22 becomes an initialization completion state. Next, the CPU 11 confirms completion of initialization of the wireless LAN interface 23 (S53). The CPU 11 waits in S53 until the wireless LAN interface 23 becomes an initialization completion state. Next, the CPU 11 shifts to a communication waiting state for the network interface (S54). In S54, the CPU 11 controls the display 14 to display that transmission and reception of data in the communication process via the network interface is acceptable. After executing S54, the CPU 11 becomes a communication waiting state in which transmission and reception of data in the communication process via the network interface is acceptable.

Next, the CPU 11 confirms completion of initialization of the USB interface 21 (S55). The CPU 11 waits in S55 until the USB interface 21 becomes an initialization completion state. Next, the CPU 11 shifts to a communication waiting state for the USB interface 21 (S56). In S56, the CPU 11 controls the display 14 to display that transmission and reception of data in the communication process via the USB interface 21 is also acceptable. After executing S56, the CPU 11 becomes a communication waiting state in which transmission and reception of data in the communication process via the USB interface 21 is also acceptable.

In S61, the CPU 11 instructs to start initialization of the three types of communication interfaces. In S61, the CPU 11 outputs an initialization start instruction to the three types of communication interfaces at the same time or in a particular order. For example, the CPU 11 first outputs the initialization start instruction to the USB interface 21, second outputs the initialization start instruction to the wired LAN interface 22, and third outputs the initialization start instruction to the wireless LAN interface 23.

Next, the CPU 11 confirms completion of initialization of the USB interface 21 (S62). The CPU 11 waits in S62 until the USB interface 21 becomes an initialization completion state. Next, CPU 11 shifts to a communication waiting state for the USB interface 21 (S63). In S63, the CPU 11 controls the display 14 to display that transmission and reception of data in the communication process via the USB interface 21 is acceptable. After executing S63, the CPU 11 becomes a communication waiting state in which transmission and reception of data in the communication process via the USB interface 21 is acceptable.

Next, the CPU 11 confirms completion of initialization of the wired LAN interface 22 (S64). The CPU 11 waits in S64 until the wired LAN interface 22 becomes an initialization completion state. Next, the CPU 11 confirms completion of initialization of the wireless LAN interface 23 (S65). The CPU 11 waits in S65 until the wireless LAN interface 23 becomes an initialization completion state. Next, the CPU 11 shifts to a communication waiting state for the network interface (S66). In S66, the CPU 11 controls the display 14 to display that transmission and reception of data in the communication process via the network interface is also acceptable. After executing S66, the CPU 11 becomes a communication waiting state in which transmission and reception of data in the communication process via the network interface is also acceptable.

After executing S46, S56 or S66, the CPU 11 ends the network priority initialization process shown in FIG. 6 and returns to the calling routine.

The network priority initialization process shown in FIG. 6 is executed when the communication process via the network interface is performed after the MFP 10 is started up (or when it is predicted that the communication process via the network interface is performed) based on the communication destination information acquired in S13. In the network priority initialization process shown in FIG. 6, after the initialization of the network interface is completed, the CPU 11 shifts to the communication waiting state in which transmission and reception of data in the communication process is acceptable.

Effects of Embodiment

In the MFP 10 according to the present embodiment, in response to determining that the external apparatus indicated by the communication destination information is the external apparatus 1 connected via the USB interface 21, after initialization of the USB interface 21 is completed, the CPU 11 shifts to the communication waiting state without waiting for completion of initialization of the network interface (S23 is executed before S24 and S25). In response to determining that the external apparatus indicated by the communication destination information is the external apparatus 2 or 3 connected via the network interface, after initialization of the network interface is completed, the CPU 11 shifts to the communication waiting state (S43 is executed after S42, and S54 is executed after S53).

Thus, according to the MFP 10 of the present embodiment, by switching the timing of shifting to the communication waiting state according to via which communication interface the external apparatus indicated by the communication destination information is connected, the CPU 11 is shifted to the communication waiting state as quickly as possible, thereby shortening the waiting time from the startup of the MFP 10 to the start of the communication process.

When the communication destination information includes the external apparatus 1 connected via the USB interface 21 and the external apparatus 2, 3 connected via the network interface, the CPU 11 selects one of the external apparatuses based on the communication history (S14: Both to S15). When the selected external apparatus is the external apparatus 1 connected via the USB interface 21, after the initialization of the USB interface 21 is completed, the CPU 11 shifts to the communication waiting state without waiting for completion of the initialization process of the network interface (S23 is executed before S24 and S25). Thus, the timing of shifting to the communication waiting state is suitably switched depending on the usage pattern.

When the preview image display mode is enabled, the initialization of the network interface is completed while the user is checking the preview image. Thus, in this case, the CPU 11 shifts to the communication waiting state without waiting for completion of the initialization of the network interface regardless of the communication destination state (S23 is executed before S24 and S25). Thus, when the user inputs a transmission instruction, the CPU 11 quickly executes a transmission process after the user checks the preview image.

Even in a case where the external apparatus indicated by the communication destination information is the external apparatus 2, 3 connected via the network interface, when the network interface is not in a physically communicable state (S33: No and S35: No), there is a possibility that the user switches the communication destination to the external apparatus 1 connected via the USB interface 21. In preparation for this case, the CPU 11 shifts to the communication waiting state without waiting for completion of the initialization of the network interface (S63 is executed before S64 and S65). This shortens the waiting time from the startup of the MFP 10 to the start of the communication process.

The time required for initialization of the wired LAN interface 22 is shorter than the time required for initialization of the wireless LAN interface 23. Thus, when the started MFP 10 first performs the communication process via the wired LAN interface 22, the CPU 11 shifts to the communication waiting state without waiting for completion of the initialization of the wireless LAN interface 23 (S42 is executed before S43). This shortens the waiting time until the communication process is ready to be started. When the started MFP 10 first performs the communication process via the wireless LAN interface 23, the CPU 11 shifts to the communication waiting state after the initialization of the wireless LAN interface 23 is completed (S54 is executed after S53). This shortens the time from when the user inputs the transmission instruction to when the CPU 11 starts the transmission process.

Modifications

While the present disclosure has been described in conjunction with various example structures outlined above and shown in the figures, various alternatives, modifications, variations, improvements, and/or substantial equivalents, whether known or that may be presently unforeseen, may become apparent to those having at least ordinary skill in the art. Accordingly, the example embodiments of the present disclosure, as set forth above, are intended to be illustrative of the present disclosure, and not limiting the present disclosure. Various changes may be made without departing from the spirit and scope of the present disclosure. Thus, the present disclosure is intended to embrace all known or later developed alternatives, modifications, variations, improvements, and/or substantial equivalents. Some specific examples of potential alternatives, modifications, or variations in the described present disclosure are provided below.

Figure 7:
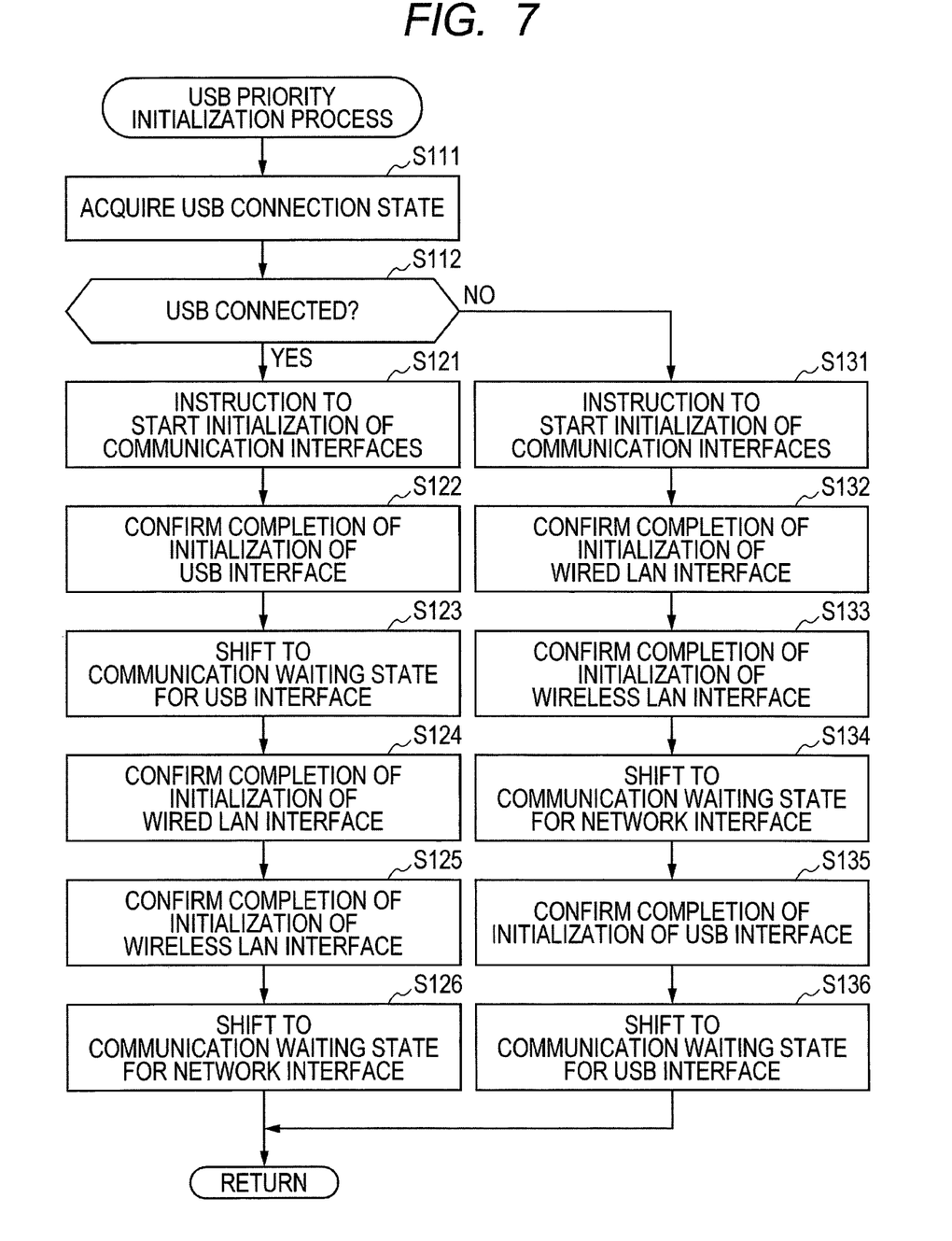
FIG. 7 is a flowchart of a USB priority initialization process of an MFP.

For example, the CPU 11 may execute a USB priority initialization process shown in FIG. 7 instead of the USB priority initialization process shown in FIG. 5.

In the USB priority initialization process shown in FIG. 7, the CPU 11 first acquires a USB connection state (S111). The USB connection state acquired in S111 includes information indicating whether the MFP 10 is connected via USB (for example, information indicating whether the USB cable 25 is inserted into the USB port 24). This information is an example of information indicating whether the USB interface 21 is in a physically communicable state.

Next, the CPU 11 determines whether the MFP 10 is connected via USB based on the USB connection state acquired in S111 (S112). In response to determining that the MFP 10 is connected via USB (S112: Yes), the CPU 11 executes S121 to S126. In S121 to S126, the same processes as S21 to S26 shown in FIG. 5 are executed.

In response to determining in S112 that the MFP 10 is not connected via USB (S112: No), the CPU 11 instructs to start initialization of the three types of communication interfaces (S131). In S131, the CPU 11 outputs an initialization start instruction to the three types of communication interfaces at the same time or in a particular order. For example, the CPU 11 first outputs the initialization start instruction to the wired LAN interface 22, second outputs the initialization start instruction to the wireless LAN interface 23, and third outputs the initialization start instruction to the USB interface 21.

Next, the CPU 11 confirms completion of initialization of the wired LAN interface 22 (S132). The CPU 11 waits in S132 until the wired LAN interface 22 becomes an initialization completion state. Next, the CPU 11 confirms completion of initialization of the wireless LAN interface 23 (S133). The CPU 11 waits in S133 until the wireless LAN interface 23 becomes an initialization completion state. Next, CPU 11 shifts to a communication waiting state for the network interface (S134). In S134, the CPU 11 controls the display 14 to display that transmission and reception of data in the communication process via the network interface is acceptable. After executing S134, the CPU 11 becomes a communication waiting state in which transmission and reception of data in the communication process via the network interface is acceptable.

Next, the CPU 11 confirms completion of initialization of the USB interface 21 (S135). The CPU 11 waits in S135 until the USB interface 21 becomes an initialization completion state. Next, the CPU 11 shifts to a communication waiting state for the USB interface 21 (S136). In S136, the CPU 11 controls the display 14 to display that transmission and reception of data in the communication process via the USB interface 21 is also acceptable. After executing S136, the CPU 11 becomes a communication waiting state in which transmission and reception of data in the communication process via the USB interface 21 is also acceptable. After executing S126 or S136, the CPU 11 ends the USB priority initialization process shown in FIG. 7 and returns to the calling routine.

Even in a case where the external apparatus indicated by the communication destination information is the external apparatus 1 connected via the USB interface 21, when the USB interface 21 is not in a physically communicable state, there is a possibility that the user switches the communication destination to the external apparatus 2, 3 connected via the network interface. In preparation for this case, in the above-described modification, the CPU 11 shifts to the communication waiting state after the initialization of the network interface is completed (S134 after S132 and S133).

In the above-described embodiment, in the USB priority initialization process (FIG. 5) in a case where it is determined that the preview image display mode is enabled, the CPU 11 shifts to the communication waiting state for the USB interface 21 after confirming completion of initialization of the USB interface 21. Alternatively, in an MFP according to a modification, in the initialization process in a case where it is determined that the preview image display mode is enabled, the CPU 11 may shift to the communication waiting state for the USB interface 21 without waiting for completion of the initialization of the USB interface 21.

In the above-described embodiment, the CPU 11 executes S15 and S16 in response to determining in S14 that the communication interface includes both the USB interface 21 and the network interface. Alternatively, in an MFP according to a modification, in response to determining in S14 that the communication interface includes both the USB interface 21 and the network interface, the CPU 11 may execute the network priority initialization process shown in FIG. 6 without executing S15 and S16. In this case, the CPU 11 shifts to the communication waiting state after the initialization of the network interface is completed. Alternatively, in response to determining in S14 that the communication interface includes both the USB interface 21 and the network interface, the CPU 11 may execute the USB priority initialization process shown in FIG. 5 without executing S15 and S16. Which initialization process is executed may be fixedly preset in the MFP 10, or may be selected by the user.

In the above-described embodiment, the CPU 11 outputs the initialization start instruction to the three types of communication interfaces at the same time or in a particular order, and then confirms completion of initialization of each communication interface. Alternatively, in an MFP according to a modification, the CPU 11 may output the initialization start instruction and confirm completion of initialization sequentially for each communication interface. For example, the CPU 11 may first perform a process of outputting an initialization start instruction for a communication interface whose initialization completion is to be confirmed with the highest priority and a process of confirming completion of initialization of the communication interface, then perform a process of outputting an initialization start instruction for a communication interface whose initialization completion is to be confirmed with the second priority and a process of confirming completion of initialization of the communication interface, and then perform a process of outputting an initialization start instruction for a communication interface whose initialization completion is to be confirmed with the third priority and a process of confirming completion of initialization of the communication interface.

In the above-described embodiment, in the MFP 10, the CPU 11 executes the control program 31 stored in the memory 12 to realize each process executed by the controller of the present disclosure. However, the configuration of the controller is not limited thereto, and a part or all of the controller may be realized by hardware such as an integrated circuit.

The present disclosure may be realized not only as the MFP 10 but also as the control program 31 that causes the CPU 11 of the MFP 10 to execute the processes. The program may be provided by being recorded on a non-transitory storage medium (non-transitory recording medium). The non-transitory storage medium may be a CD-ROM, a DVD-ROM, and so on, or may include a storage mounted on a server that is connectable to the MFP 10 and the external apparatuses via a communication network. The program stored in the storage of the server may be distributed as information or signals indicating the program via a communication network such as the Internet.

What is claimed is:

1. A communication apparatus comprising:
a first communication interface;
a second communication interface; and
a controller configured to:
  acquire communication destination information, the communication destination information including at least a first external apparatus connected via the first communication interface or a second external apparatus connected via the second communication interface;
  perform initialization of the first communication interface and the second communication interface, the initialization including:

in response to determining that an external apparatus indicated by the communication destination information is the first external apparatus, after completing initialization of the first communication interface, shifting to a communication waiting state in which transmission and reception of data is acceptable; and in response to determining that the external apparatus indicated by the communication destination information is the second external apparatus, shifting to the communication waiting state after completing initialization of the second communication interface; and perform communication with at least the first external apparatus or the second external apparatus, the communication including transmission and reception of the data.

2. The communication apparatus according to claim 1, wherein time required for initialization of the first communication interface is shorter than time required for initialization of the second communication interface; and
wherein the controller is configured to:
in response to determining that the external apparatus indicated by the communication destination information is the first external apparatus, after completing initialization of the first communication interface, shift to the communication waiting state without waiting for completion of initialization of the second communication interface.

3. The communication apparatus according to claim 1, wherein the controller is configured to acquire the communication destination information including an external apparatus that is set as a transmission destination of the data.

4. The communication apparatus according to claim 1, further comprising a memory configured to store a communication history,
wherein the controller is configured to acquire the communication destination information including an external apparatus stored in the communication history.

5. The communication apparatus according to claim 4, wherein the controller is configured to:
in response to determining that the external apparatus indicated by the communication destination information includes the first external apparatus and the second external apparatus, select either the first external apparatus or the second external apparatus based on the communication history; and
in response to selecting the first external apparatus, after completing initialization of the first communication interface, shift to the communication waiting state without waiting for completion of initialization of the second communication interface.

6. The communication apparatus according to claim 1, wherein the controller is configured to:
in response to determining that the external apparatus indicated by the communication destination information includes the first external apparatus and the second external apparatus, shift to the communication waiting state after completing initialization of the second communication interface.

7. The communication apparatus according to claim 1, further comprising a display,
wherein the controller is configured to:
acquire a planned transmission mode before performing the initialization, the planned transmission mode including a preview image display mode of displaying a preview image on the display before transmitting the data; and
in response to determining that the preview image display mode is enabled in the planned transmission mode, regardless of the communication destination information, shift to the communication waiting state without waiting for completion of initialization of the second communication interface.

8. The communication apparatus according to claim 1, wherein the controller is configured to:
in response to determining that the external apparatus indicated by the communication destination information is the second external apparatus, determine whether the second communication interface is in a physically communicable state; and
in response to determining that the second communication interface is not in the physically communicable state, after completing initialization of the first communication interface, shift to the communication waiting state without waiting for completion of initialization of the second communication interface.

9. The communication apparatus according to claim 1, wherein the controller is configured to:
in response to determining that the external apparatus indicated by the communication destination information is the first external apparatus, determine whether the first communication interface is in a physically communicable state; and
in response to determining that the first communication interface is not in the physically communicable state, shift to the communication waiting state after completing initialization of the second communication interface.

10. The communication apparatus according to claim 1, wherein the second communication interface is a wired network interface or a wireless network interface; and
wherein the controller is configured to:
in response to determining that the external apparatus indicated by the communication destination information is the second external apparatus, determine whether the second communication interface is the wired network interface or the wireless network interface;
in response to determining that the second communication interface is the wired network interface, shift to the communication waiting state without waiting for completion of initialization of the wireless network interface; and
in response to determining that the second communication interface is the wireless network interface, shift to the communication waiting state after completion of initialization of the wireless network interface.

11. A non-transitory computer-readable storage medium storing a set of program instructions for a communication apparatus comprising a first communication interface, a second communication interface, and a controller, the set of program instructions, when executed by the controller, causing the communication apparatus to:
acquire communication destination information, the communication destination information including at least a first external apparatus connected via the first communication interface or a second external apparatus connected via the second communication interface;

perform initialization of the first communication interface and the second communication interface, the initialization including:
- in response to determining that an external apparatus indicated by the communication destination information is the first external apparatus, after completing initialization of the first communication interface, shifting to a communication waiting state in which transmission and reception of data is acceptable; and
- in response to determining that the external apparatus indicated by the communication destination information is the second external apparatus, shifting to the communication waiting state after completing initialization of the second communication interface; and perform communication with at least the first external apparatus or the second external apparatus, the communication including transmission and reception of the data.

12. The non-transitory computer-readable storage medium according to claim 11, wherein time required for initialization of the first communication interface is shorter than time required for initialization of the second communication interface; and
wherein the set of program instructions, when executed by the controller, causes the communication apparatus to:
- in response to determining that the external apparatus indicated by the communication destination information is the first external apparatus, after completing initialization of the first communication interface, shift to the communication waiting state without waiting for completion of initialization of the second communication interface.

13. The non-transitory computer-readable storage medium according to claim 11, wherein the set of program instructions, when executed by the controller, causes the communication apparatus to:
acquire the communication destination information including an external apparatus that is set as a transmission destination of the data.

14. The non-transitory computer-readable storage medium according to claim 11, wherein the communication apparatus further comprises a memory configured to store a communication history; and
wherein the set of program instructions, when executed by the controller, causes the communication apparatus to:
acquire the communication destination information including an external apparatus stored in the communication history.

15. The communication apparatus according to claim 14, wherein the set of program instructions, when executed by the controller, causes the communication apparatus to:
- in response to determining that the external apparatus indicated by the communication destination information includes the first external apparatus and the second external apparatus, select either the first external apparatus or the second external apparatus based on the communication history; and
- in response to selecting the first external apparatus, after completing initialization of the first communication interface, shift to the communication waiting state without waiting for completion of initialization of the second communication interface.

16. The non-transitory computer-readable storage medium according to claim 11, wherein the set of program instructions, when executed by the controller, causes the communication apparatus to:
- in response to determining that the external apparatus indicated by the communication destination information includes the first external apparatus and the second external apparatus, shift to the communication waiting state after completing initialization of the second communication interface.

17. The non-transitory computer-readable storage medium according to claim 11, wherein the communication apparatus further comprises a display; and
wherein the set of program instructions, when executed by the controller, causes the communication apparatus to:
- acquire a planned transmission mode before performing the initialization, the planned transmission mode including a preview image display mode of displaying a preview image on the display before transmitting the data; and
- in response to determining that the preview image display mode is enabled in the planned transmission mode, regardless of the communication destination information, shift to the communication waiting state without waiting for completion of initialization of the second communication interface.

18. The non-transitory computer-readable storage medium according to claim 11, wherein the set of program instructions, when executed by the controller, causes the communication apparatus to:
- in response to determining that the external apparatus indicated by the communication destination information is the second external apparatus, determine whether the second communication interface is in a physically communicable state; and
- in response to determining that the second communication interface is not in the physically communicable state, after completing initialization of the first communication interface, shift to the communication waiting state without waiting for completion of initialization of the second communication interface.

19. The non-transitory computer-readable storage medium according to claim 11, wherein the set of program instructions, when executed by the controller, causes the communication apparatus to:
- in response to determining that the external apparatus indicated by the communication destination information is the first external apparatus, determine whether the first communication interface is in a physically communicable state; and
- in response to determining that the first communication interface is not in the physically communicable state, shift to the communication waiting state after completing initialization of the second communication interface.

20. The non-transitory computer-readable storage medium according to claim 11, wherein the second communication interface is a wired network interface or a wireless network interface; and
wherein the set of program instructions, when executed by the controller, causes the communication apparatus to:
- in response to determining that the external apparatus indicated by the communication destination information is the second external apparatus, determine whether the second communication interface is the wired network interface or the wireless network interface;

in response to determining that the second communication interface is the wired network interface, shift to the communication waiting state without waiting for completion of initialization of the wireless network interface; and in response to determining that the second communication interface is the wireless network interface, shift to the communication waiting state after completion of initialization of the wireless network interface.

\* \* \* \* \*